US012591108B2

(12) United States Patent
Nakano et al.

(10) Patent No.: US 12,591,108 B2
(45) Date of Patent: Mar. 31, 2026

(54) LENS BARREL AND IMAGING APPARATUS

(71) Applicant: NIKON CORPORATION, Tokyo (JP)

(72) Inventors: Takumi Nakano, Tokyo (JP); Takuji Hamasaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 398 days.

(21) Appl. No.: 17/919,603

(22) PCT Filed: May 26, 2021

(86) PCT No.: PCT/JP2021/019984
§ 371 (c)(1),
(2) Date: Oct. 18, 2022

(87) PCT Pub. No.: WO2021/251142
PCT Pub. Date: Dec. 16, 2021

(65) Prior Publication Data
US 2023/0176321 A1     Jun. 8, 2023

(30) Foreign Application Priority Data

Jun. 12, 2020     (JP) ................................ 2020-102216

(51) Int. Cl.
*G02B 7/10* (2021.01)
*G03B 13/34* (2021.01)
*H04N 23/00* (2023.01)

(52) U.S. Cl.
CPC .............. *G02B 7/10* (2013.01); *G03B 13/34* (2013.01); *H04N 23/00* (2023.01)

(58) Field of Classification Search
CPC .............. G02B 7/02; G02B 7/021–028; G02B 7/003–005; G02B 7/04–105;
(Continued)

(56) References Cited

U.S. PATENT DOCUMENTS

2006/0176586 A1*   8/2006   Yamamoto ............... G02B 7/10
                                                    359/819
2011/0181967 A1       7/2011   Wakamizu
(Continued)

FOREIGN PATENT DOCUMENTS

CN          102099739 A      6/2011
CN          107111099 A      8/2017
CN          111133354 A      5/2020
JP          2010-020067 A    1/2010
JP          2019-032565 A    2/2019
JP              6819433 B2  *  1/2021

OTHER PUBLICATIONS

English translation of JP6819433, Nov. 15, 2018; (Year: 2018).*
(Continued)

*Primary Examiner* — Marin Pichler
*Assistant Examiner* — Kuei-Jen L Edenfield
(74) *Attorney, Agent, or Firm* — Oliff PLC

(57)     ABSTRACT

A lens barrel includes a first lens holding frame that holds a first lens and has a first protruding portion, a first motor configured to move the first lens holding frame in an optical axis direction, a second lens holding frame that holds a second lens and has a second protruding portion, a second motor configured to move the second lens holding frame in the optical axis direction, and an outer barrel that has a straight groove engaging with the first protruding portion and the second protruding portion and extending in the optical axis direction, and is disposed further outward than the first lens holding frame and the second lens holding frame.

11 Claims, 12 Drawing Sheets

(58) Field of Classification Search
CPC ........ G02B 7/14–16; G02B 7/06; G02B 7/12;
G03B 13/34; G03B 3/10; G03B 30/00;
H04N 23/00
USPC .................................. 359/694–706, 822–830
See application file for complete search history.

(56) References Cited

U.S. PATENT DOCUMENTS

| | | | |
|---|---|---|---|
| 2014/0169781 A1* | 6/2014 | Araki .................... | G03B 17/14 |
| | | | 396/529 |
| 2018/0017758 A1 | 1/2018 | Takehana et al. | |
| 2019/0064475 A1 | 2/2019 | Kobayashi | |
| 2020/0225441 A1 | 7/2020 | Kishimoto et al. | |

OTHER PUBLICATIONS

Aug. 3, 2021 International Search Report issued in Patent Application No. PCT/JP2021/019984.
May 9, 2023 Office Action issued in Japanese Patent Application No. 2022-530118.
Dec. 13, 2022 International Preliminary Report on Patentability issued in International Patent Application No. PCT/JP2021/019984.
Mar. 31, 2025 Office Action issued in Chinese Patent Application No. 202180032107.2.

* cited by examiner

FIG. 7A
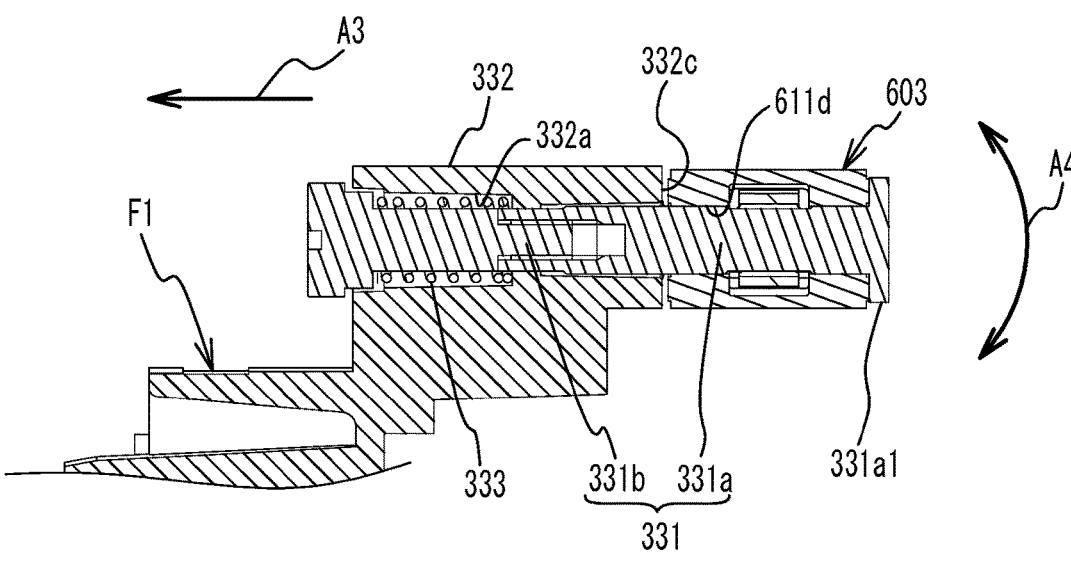
FIG. 7B
FIG. 7C
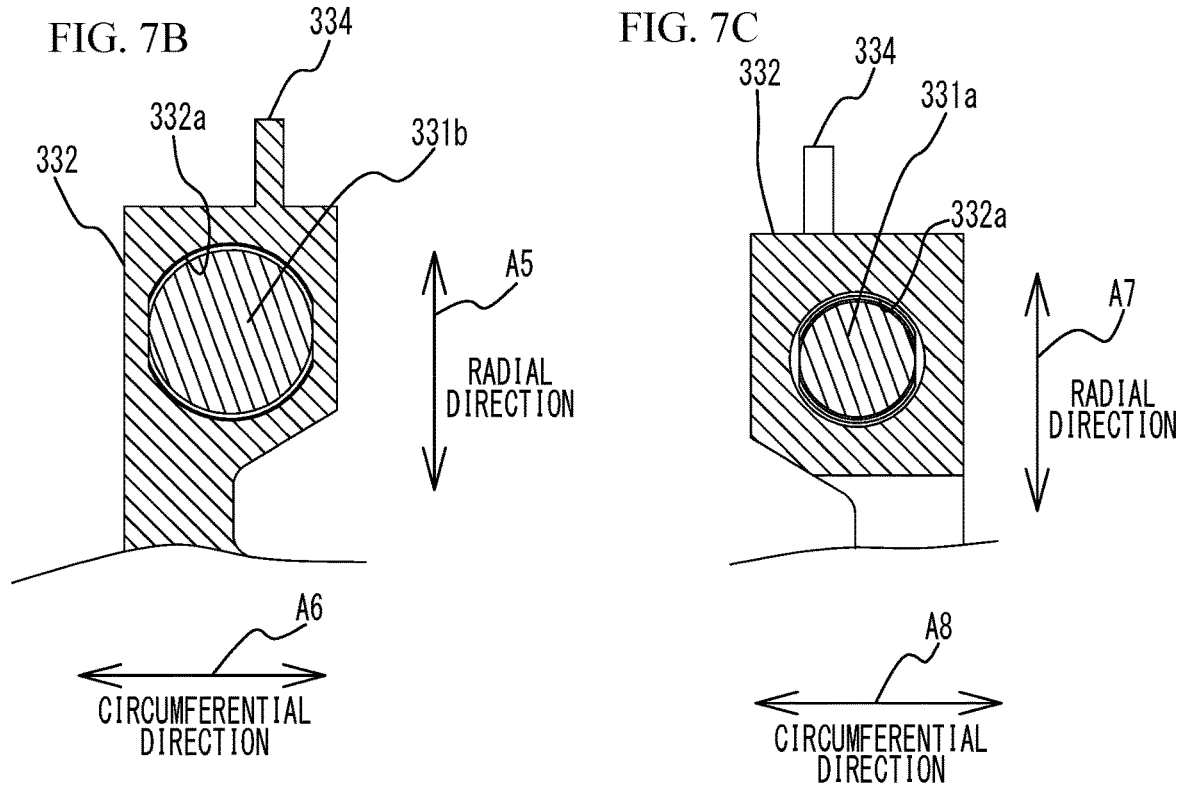

LENS BARREL AND IMAGING APPARATUS

TECHNICAL FIELD

The present disclosure relates to a lens barrel and an imaging apparatus.

BACKGROUND ART

A lens barrel in which a plurality of lens groups are separately driven by independent actuators has been proposed (for example, Patent Document 1). In addition, it is desired to accurately move a plurality of lens groups.

PRIOR ART DOCUMENT

Patent Document

Patent Document 1: Japanese Patent Application Laid-Open No. 2019-32565

SUMMARY OF THE INVENTION

According to a first aspect, a lens barrel includes: a first lens holding frame that holds a first lens and has a first protruding portion; a first motor configured to move the first lens holding frame in an optical axis direction; a second lens holding frame that holds a second lens and has a second protruding portion; a second motor configured to move the second lens holding frame in the optical axis direction; and an outer barrel that has a straight groove engaging with the first protruding portion and the second protruding portion and extending in the optical axis direction, and is disposed further outward than the first lens holding frame and the second lens holding frame.

According to a second aspect, an imaging apparatus includes the above lens barrel.

Note that the configuration of the embodiment described below may be appropriately modified, and at least a part thereof may be replaced with another configuration. Further, constituent elements whose arrangement is not particularly limited are not necessarily arranged as disclosed in the embodiments, and can be arranged at positions where the functions thereof can be achieved.

BRIEF DESCRIPTION OF THE DRAWINGS

FIG. 7A is a cross-sectional view taken along line A-A in FIG. 6B, FIG. 7B is a cross-sectional view taken along line B-B in FIG. 6B, and FIG. 7C is a cross-sectional view taken along line C-C in FIG. 6B;

MODES FOR CARRYING OUT THE INVENTION

Figure 1:
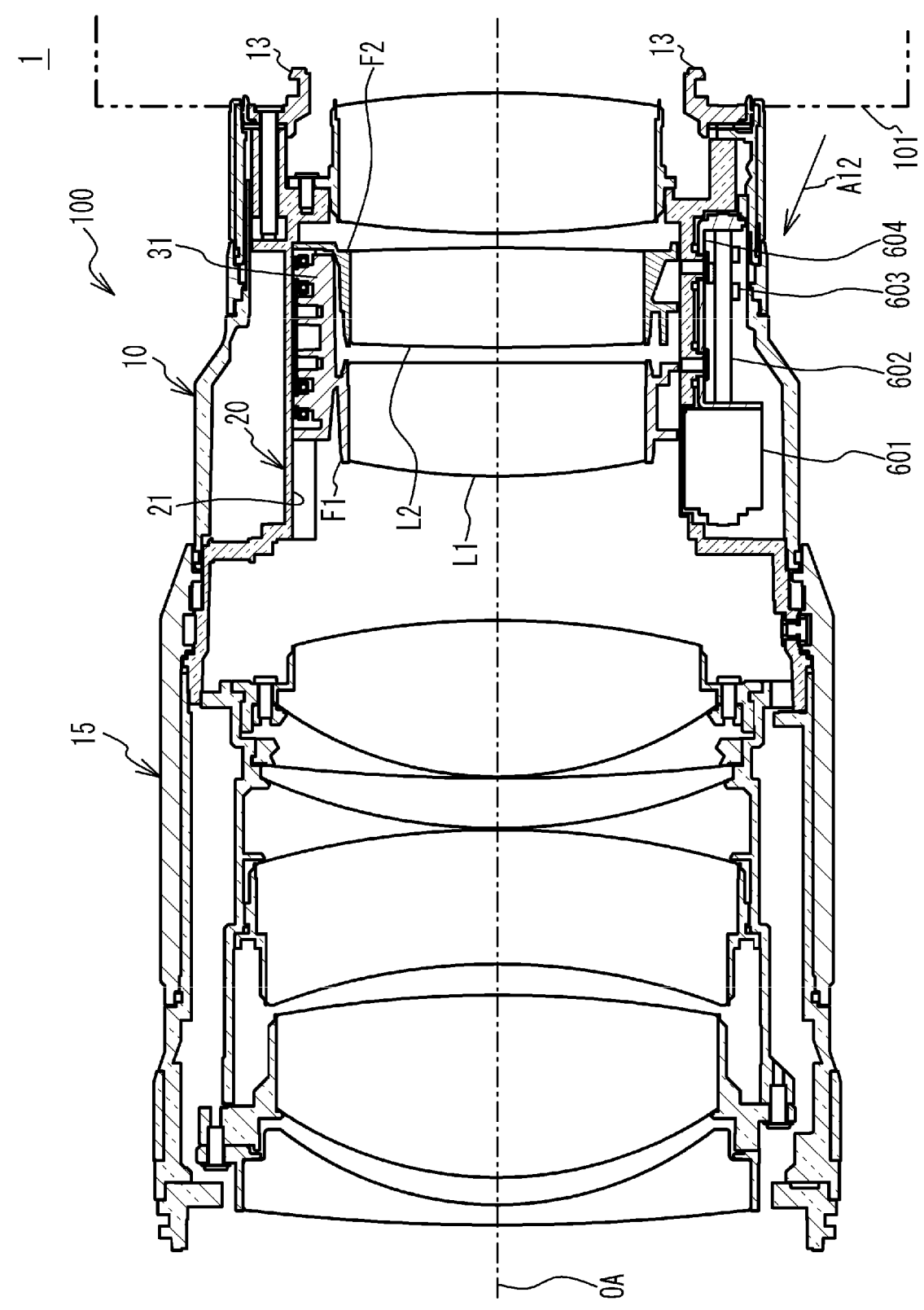
FIG. 1 is a cross-sectional view of a lens barrel in accordance with an embodiment.
Figures 2A, 2B:
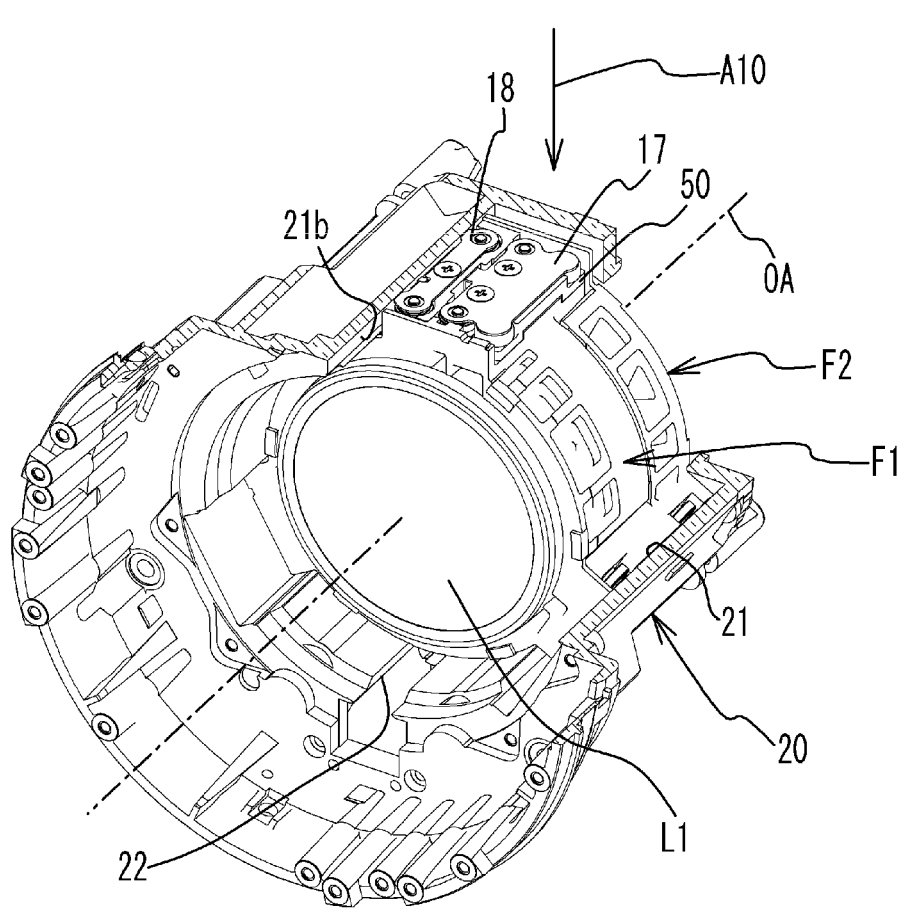
FIG. 2A is a partial cross-sectional perspective view illustrating a relationship among a second fixed barrel, a first lens holding frame, and a second lens holding frame.
FIG. 2B is a partial cross-sectional view when the second fixed barrel is viewed from a direction indicated by an arrow A10 in FIG. 2A.
Figure 3:
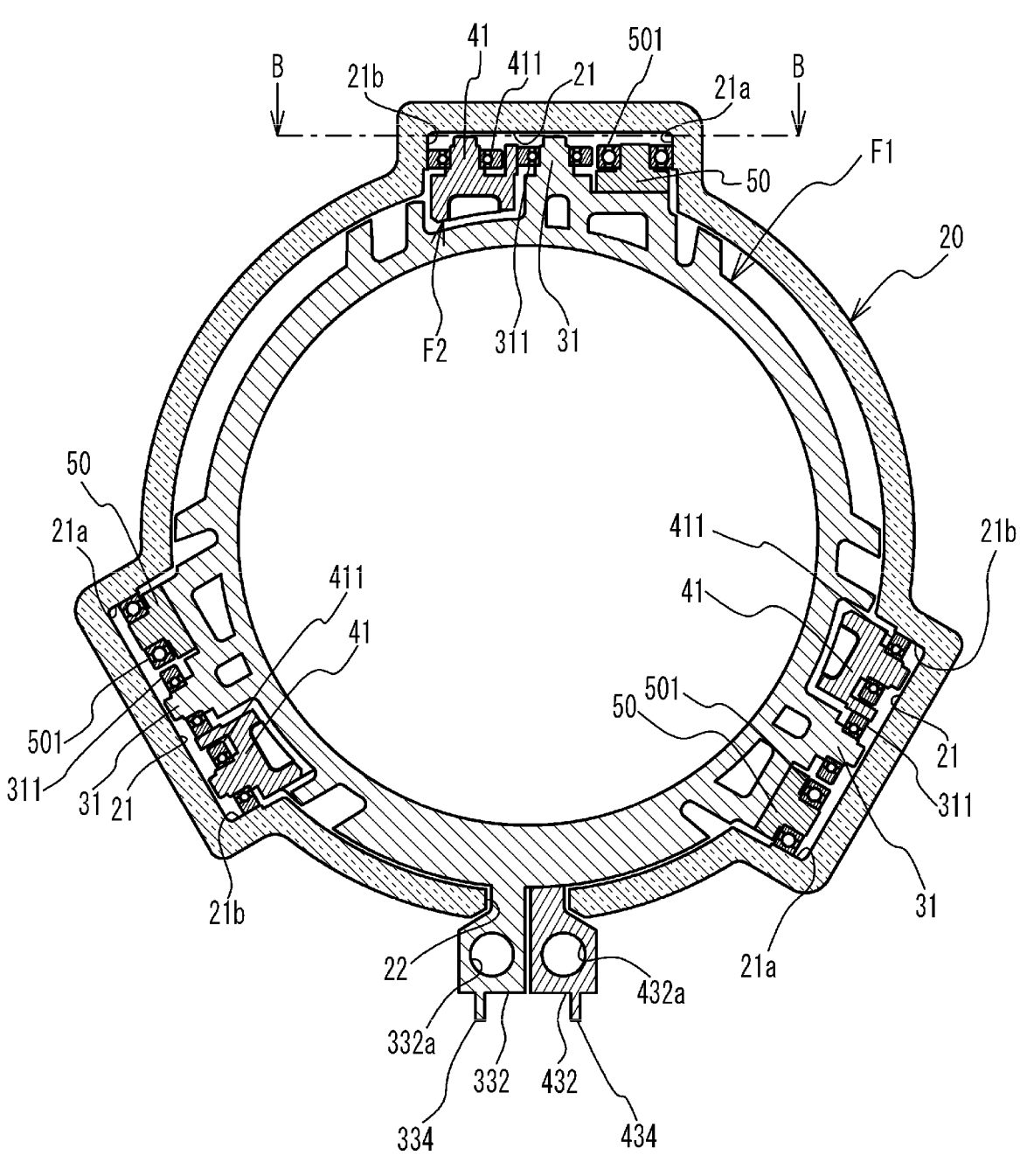
FIG. 3 is a cross-sectional view taken along line A-A in FIG. 2B.

Hereinafter, embodiments will be described with reference to the drawings. FIG. 1 is a diagram illustrating a camera 1 including a lens barrel 100 in accordance with the present embodiment and a camera body 101. FIG. 2A is a partial cross-sectional perspective view illustrating a relationship among a second fixed barrel 20, a first lens holding frame F1, and a second lens holding frame F2, which will be described later, and FIG. 2B is a partial cross-sectional view when the second fixed barrel 20 is viewed from a direction indicated by an arrow A10 in FIG. 2A. FIG. 3 is a cross-sectional view taken along line A-A in FIG. 2B.

In the present embodiment, the lens barrel 100 is attachable to and detachable from the camera body 101, but the present invention is not limited thereto, and the lens barrel 100 and the camera body 101 may be integrated.

As illustrated in FIG. 1, the lens barrel 100 in accordance with the present embodiment includes a first fixed barrel 10, the second fixed barrel 20 disposed further inward than the first fixed barrel 10, and a focus ring 15 disposed further outward than the first fixed barrel 10. In the present embodiment, the first fixed barrel 10 is composed of a plurality of components, but may be composed of one component. As illustrated in FIG. 1, a lens mount 13 that enables the lens barrel 100 to be attached to and detached from the camera body 101 is fixed to the first fixed barrel 10.

Further, the lens barrel 100 includes a plurality of lens groups that are sequentially arranged along a common optical axis OA and include a first lens group L1 and a second lens group L2. Each of the first lens group L1 and the second lens group L2 is a focus lens group.

The first lens group L1 is held by a first lens holding frame F1, the second lens group L2 is held by a second lens holding frame F2, and the other lens groups are held by the first fixed barrel 10.

Although the details will be described later, the first lens holding frame F1 and the second lens holding frame F2 are driven by a first drive source unit 60 and a second drive source unit 70, respectively. As the first drive source unit 60 or the second drive source unit 70, for example, a stepping motor, a voice coil motor, an ultrasonic motor, or the like can be used. As a result, for example, the first lens holding frame F1 and the second lens holding frame F2 move linearly in the optical axis OA direction individually or integrally in accordance with the operation of the focus ring 15.

As illustrated in FIG. 2A, the first lens holding frame F1 and the second lens holding frame F2 are disposed inside the second fixed barrel 20. As illustrated in FIG. 1 and FIG. 2A, the second fixed barrel 20 has a plurality of (three in the present embodiment) straight grooves 21 extending in the optical axis OA direction, and a hole 22 penetrating through the second fixed barrel 20 and extending in the optical axis OA direction.

In the present embodiment, in a wall portion of a portion of the second fixed barrel 20 that accommodates the first lens holding frame F1 and the second lens holding frame F2, an opening that penetrates through the wall portion (communicates the inside and the outside of the wall portion) is not formed other than the hole 22. Therefore, it is possible to reduce light leakage from the outside to the inside of the second fixed barrel 20, and it is also easy to take measures against light leakage. Further, the strength of the second fixed barrel 20 is also improved.

As illustrated in FIG. 3, the first lens holding frame F1 includes first protruding portions 31 that protrude in a direction intersecting the optical axis OA direction, and the second lens holding frame F2 includes second protruding portions 41 that protrude in a direction intersecting the optical axis OA direction. The first protruding portions 31 and the second protruding portions 41 are engaged with the straight grooves 21 of the second fixed barrel 20. More specifically, the first protruding portion 31 and the second protruding portion 41 are in contact with each other, and the first protruding portion 31 and the second protruding portion 41 are engaged with the straight groove 21 while being in contact with each other.

A block 50 that is in contact with a wall 21a is provided between the first protruding portion 31 and the wall 21a of the straight groove 21. The block 50 is assembled to the first lens holding frame F1 so as to move integrally with the first lens holding frame F1 (the first protruding portion 31) in the optical axis OA direction but be movable relative to the first protruding portion 31 in the circumferential direction around the optical axis OA. Since the first protruding portion 31, the second protruding portion 41, and the block 50 are engaged with the straight groove 21, the rotation of the first lens holding frame F1 and the second lens holding frame F2 about the optical axis OA is restricted, and the first lens holding frame F1 and the second lens holding frame F2 are guided by the straight groove 21 and move linearly in the optical axis OA direction.

Here, the relationship among the second fixed barrel 20, the first protruding portion 31 of the first lens holding frame F1, the second protruding portion 41 of the second lens holding frame F2, and the block 50 will be described with reference to FIG. 4A and FIG. 4B.

Figures 4A, 4B:
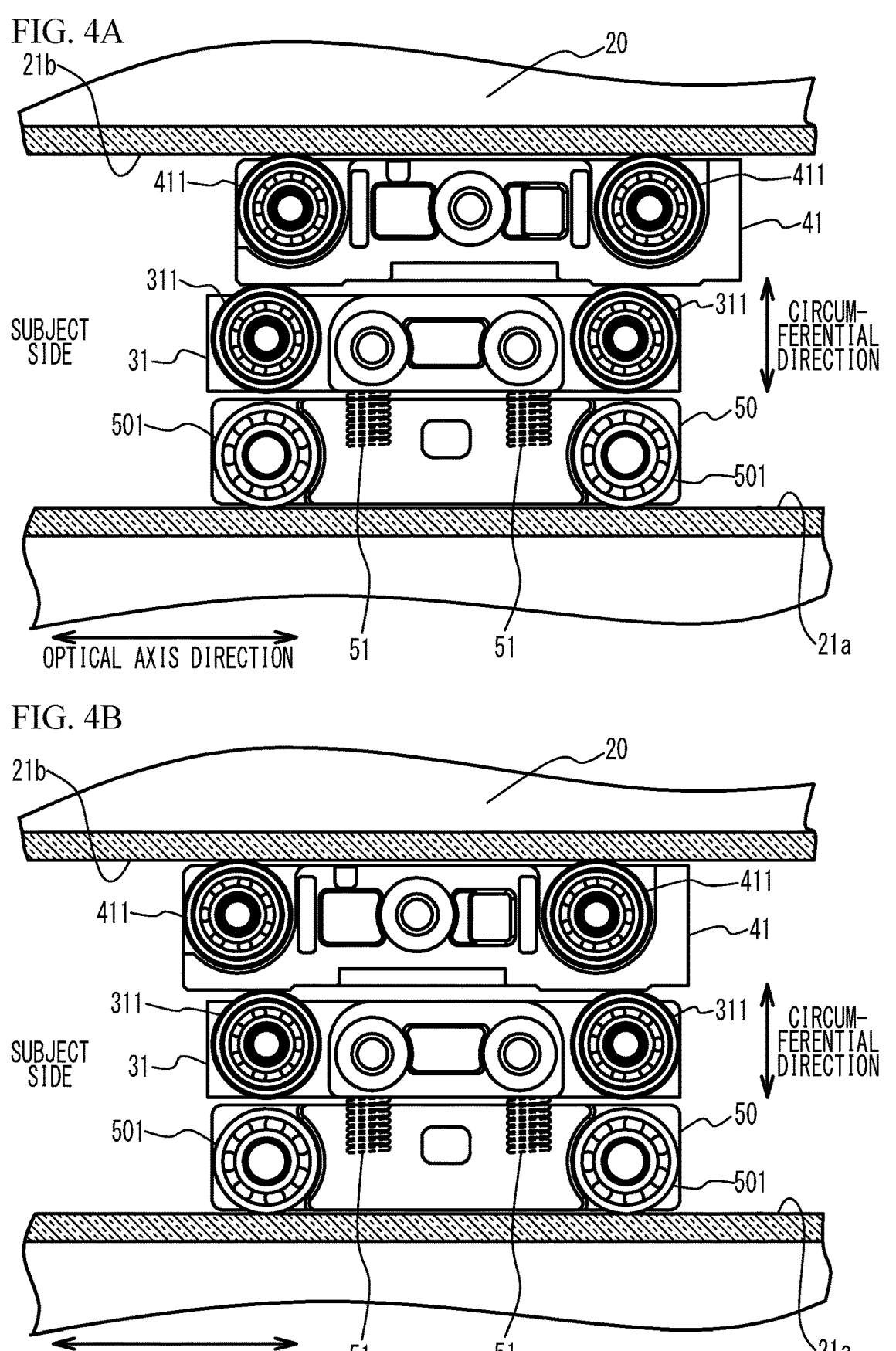
FIG. 4A and FIG. 4B are cross-sectional views taken along line B-B in FIG. 3.

FIG. 4A and FIG. 4B are cross-sectional views taken along line B-B in FIG. 3, FIG. 4A illustrates a state in which the first lens group L1 and the second lens group L2 are most distant from each other in the optical axis OA direction, and FIG. 4B illustrates a state in which the first lens group L1 and the second lens group L2 are closest to each other in the optical axis OA direction. In FIG. 4A and FIG. 4B, the main body portion of the first lens holding frame F1 and the main body portion of the second lens holding frame F2 are not illustrated.

As illustrated in FIG. 4A and FIG. 4B, compression springs 51 that bias the first protruding portion 31 and the block 50 in a direction in which the first protruding portion 31 and the block 50 move away from each other are provided between the first protruding portion 31 and the block 50. The compression spring 51 may be another biasing member such as a leaf spring.

The compression springs 51 press the block 50 against the wall 21a of the straight groove 21, and bias the first protruding portion 31 against the second protruding portion 41. As a result, it is possible to reduce backlash when the first lens holding frame F1 and the second lens holding frame F2 move independently (it is possible to reduce backlash between the first lens holding frame F1 and the second lens holding frame F2), and it is possible to accurately move the first lens holding frame F1 and the second lens holding frame F2 in each of the straight grooves 21.

In addition, since the second protruding portion 41 is pressed against a wall 21b of the straight groove 21 of the second fixed barrel 20 through the first protruding portion 31 by the compression springs 51, backlash when the first lens holding frame F1 and the second lens holding frame F2 move is reduced, and the first lens holding frame F1 and the second lens holding frame F2 can be moved with high accuracy in the straight groove 21.

As illustrated in FIG. 4A and FIG. 4B, the first protruding portion 31 and the second protruding portion 41 at least partially overlap each other in the circumferential direction about the optical axis OA. More specifically, regardless of whether the first lens group L1 and the second lens group L2 are most distant from each other or closest to each other, the first protruding portion 31 and the second protruding portion 41 at least partially overlap each other in the circumferential direction about the optical axis OA. Thus, the first protruding portion 31 and the second protruding portion 41 can guide each other in the optical axis OA direction.

The second protruding portion 41 of the second lens holding frame F2 includes bearings 411, and is in contact with one wall 21b of the walls of the straight groove 21 in the circumferential direction. The first protruding portion 31 of the first lens holding frame F1 has bearings 311, and is in contact with the second protruding portion 41. The block 50 includes bearings 501 and is in contact with the other wall 21a of the walls of the straight groove 21 in the circumferential direction. As illustrated in FIG. 2A and FIG. 2B, plates 17 and 18 are attached to the first protruding portion 31 and the second protruding portion 41, respectively, so that the bearings 311, 411, and 501 do not come off during assembly of the lens barrel 100, but the plates 17 and 18 are not illustrated in FIG. 3 and subsequent figures. The plates 17 and 18 may not be necessarily used. That is, the plates 17 and 18 may not be necessarily present between the bearings 311, 411, 501 and the straight groove 21.

When the first lens holding frame F1 moves in the optical axis OA direction relative to the second lens holding frame F2 and the second fixed barrel 20, the sliding resistance between the first protruding portion 31 and the second protruding portion 41 and the sliding resistance between the block 50 and the wall 21a can be reduced by the bearings 311 and the bearings 501. Further, when the second lens holding frame F2 moves in the optical axis OA direction relative to the first lens holding frame F1 and the second fixed barrel 20, the sliding resistance between the wall 21b and the second protruding portion 41 and the sliding resistance between the first protruding portion 31 and the second protruding portion 41 can be reduced by the bearings 311 and the bearings 411. Further, the sliding resistance when the first lens holding frame F1 and the second lens holding frame F2 move in the optical axis OA direction can be reduced by the bearings 411 and the bearings 501.

In the present embodiment, a case in which the first protruding portion 31, the second protruding portion 41, and the block 50 respectively include the bearings 311, the bearings 411, and the bearings 501 will be described. However, at least one of the first protruding portion 31, the second protruding portion 41, or the block 50 is only required to include a bearing. For example, a protrusion may be provided instead of the bearing.

Figure 5A:
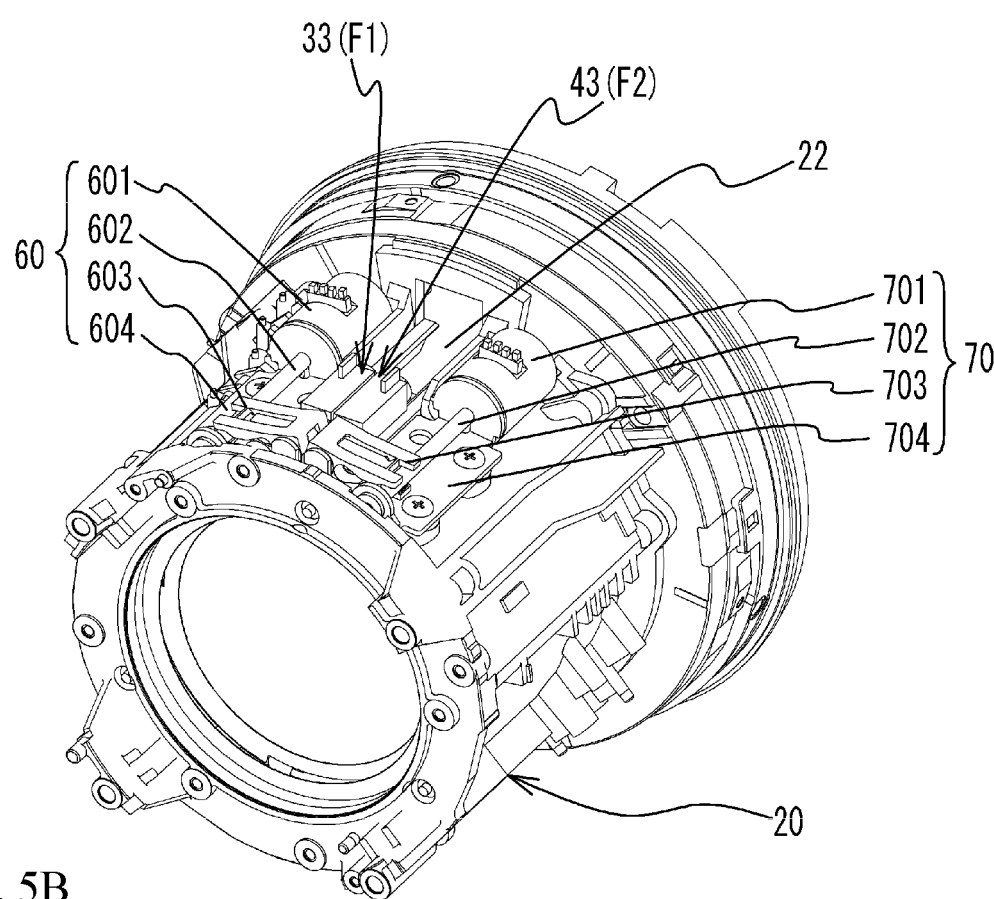
FIG. 5A is a schematic perspective view of the second fixed barrel viewed from a direction indicated by an arrow A12 in FIG. 1.
Figure 5B:
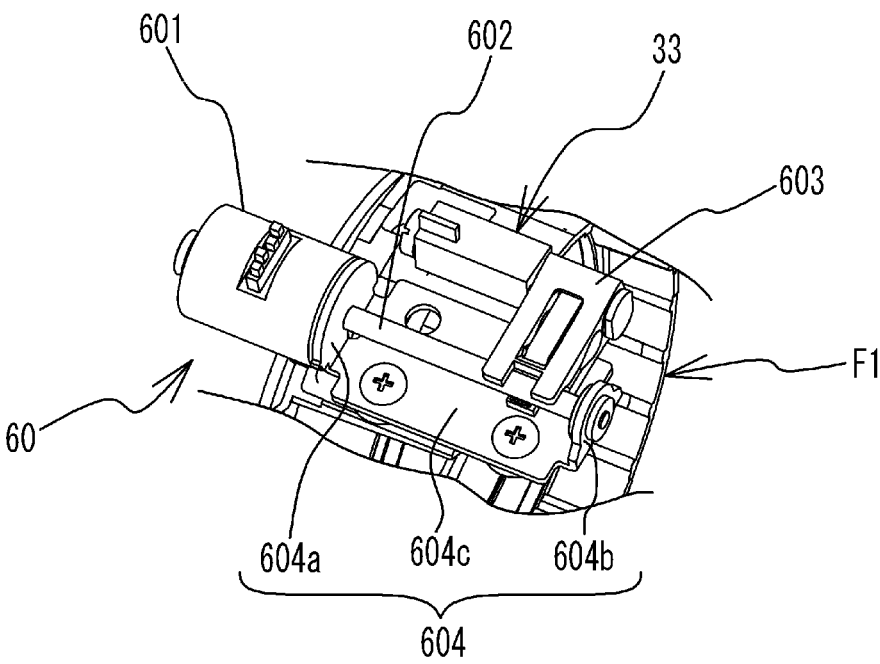
FIG. 5B is an enlarged view of a first drive source unit.

Next, drive mechanisms for driving the first lens holding frame F1 and the second lens holding frame F2 will be described. FIG. 5A is a schematic perspective view of the second fixed barrel 20 viewed from a direction indicated by an arrow A12 in FIG. 1, and FIG. 5B is an enlarged view of the first drive source unit. In FIG. 5B, the second fixed barrel 20 is not illustrated.

As illustrated in FIG. 5A, the first drive source unit 60 for moving the first lens holding frame F1 in the optical axis OA direction and the second drive source unit 70 different from the first drive source unit 60 for moving the second lens holding frame F2 in the optical axis OA direction are fixed to the outer peripheral portion of the second fixed barrel 20.

The first drive source unit 60 and the second drive source unit 70 are provided between two straight grooves 21 disposed side by side in the circumferential direction around the optical axis OA among the plurality of (for example, three) the straight grooves 21 included in the second fixed barrel 20. Further, the first drive source unit 60 and the second drive source unit 70 are provided at positions facing each other with the hole 22 of the second fixed barrel 20 interposed therebetween. More specifically, the first drive source unit 60 and the second drive source unit 70 are disposed symmetrically with respect to the hole 22 in the circumferential direction around the optical axis OA.

Next, the configurations of the first drive source unit 60 and the second drive source unit 70 will be described.

As illustrated in FIG. 5B, the first drive source unit 60 includes a stepping motor 601, a lead screw 602, a rack 603, and a mounting member 604. The second drive source unit 70 includes a stepping motor 701, a lead screw 702, a rack 703, and a mounting member 704. Since the first drive source unit 60 and the second drive source unit 70 have the same configuration, the configuration of the first drive source unit 60 will be described below, and detailed description of the configuration of the second drive source unit 70 will be omitted.

The mounting member 604 is a U-shaped member, and includes a first portion 604a to which the stepping motor 601 is fixed, a second portion 604b facing the first portion 604a, and a third portion 604c extending parallel to the lead screw 602 between the first portion 604a and the second portion 604b. A plurality of holes are formed in the third portion 604c, and as illustrated in FIG. 5B, the first drive source unit 60 is fixed to the second fixed barrel 20 by screwing the mounting member 604 to the outer peripheral surface of the second fixed barrel 20 with screws or the like. Thus, the peripheral wall of the second fixed barrel 20 is present between the lead screw 602 and the first lens holding frame F1 in the radial direction of the second fixed barrel 20. Further, the lead screw 602 is disposed further outward than the third portion 604c.

The lead screw 602 is directly connected to the output shaft of the stepping motor 601 and extends in the optical axis OA direction. The tip of the lead screw 602 is rotatably supported by the second portion 604b of the mounting member 604. Since the tip of the lead screw 602 is rotatably supported by the second portion 604b of the mounting member 604, the deflection of the tip is suppressed.

The rack 603 is engaged with the lead screw 602. The rack 603 is held by a rack holding mechanism 33 provided in the first lens holding frame F1. The rack 703 of the second drive source unit 70 is held by a rack holding mechanism 43 provided in the second lens holding frame F2 (see FIG. 5A).

Here, the rack 603 and the rack holding mechanism 33 will be described. The rack 703 and the rack holding mechanism 43 have configurations similar to those of the rack 603 and the rack holding mechanism 33, respectively.

Figure 6A:
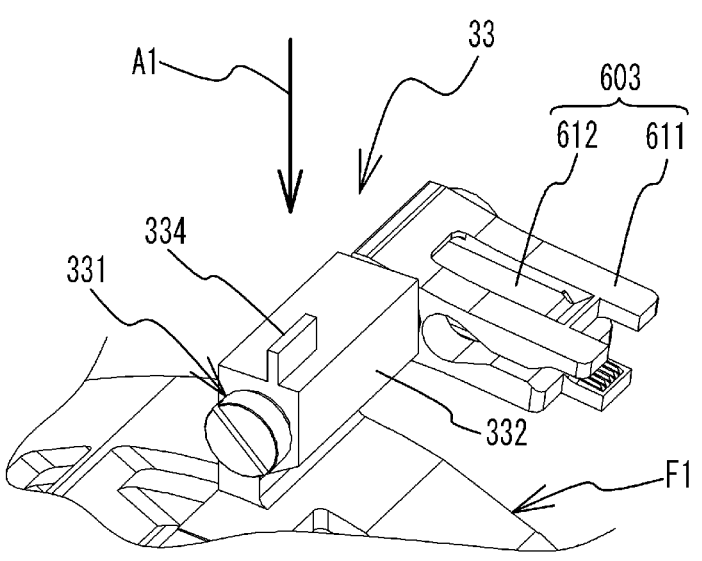
FIG. 6A is an enlarged view of a rack holding mechanism.
Figure 6B:
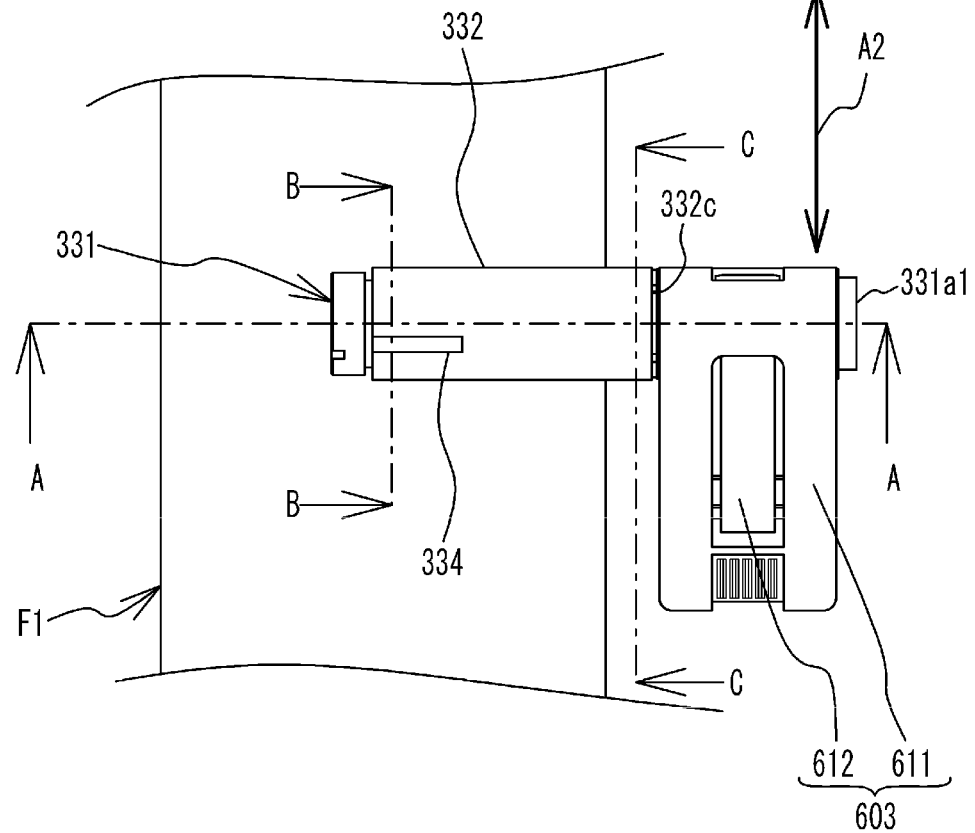
FIG. 6B illustrates the rack holding mechanism viewed from a direction indicated by an arrow A1 in FIG. 6A.
Figure 8A:
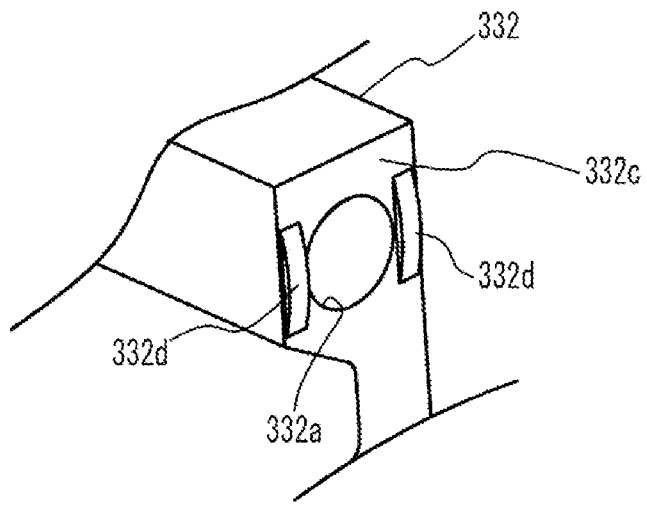
FIG. 8A is an enlarged view of a rack-side surface of a shaft holding portion.

FIG. 6A is an enlarged view of the rack 603 and the rack holding mechanism 33, and FIG. 6B illustrates the rack 603 and the rack holding mechanism 33 when viewed from a direction indicated by an arrow A1 in FIG. 6A. FIG. 7A is a cross-sectional view taken along line A-A in FIG. 6B, FIG. 7B is a cross-sectional view taken along line B-B in FIG. 6B, and FIG. 7C is a cross-sectional view taken along line C-C in FIG. 6B. FIG. 8A is an enlarged view of a rack-side surface of a shaft holding portion, and FIG. 8B is a side view of the rack.

As illustrated in FIG. 6A and the like, the rack 603 includes a rack body 611 and a biasing member 612.

Figure 8B:
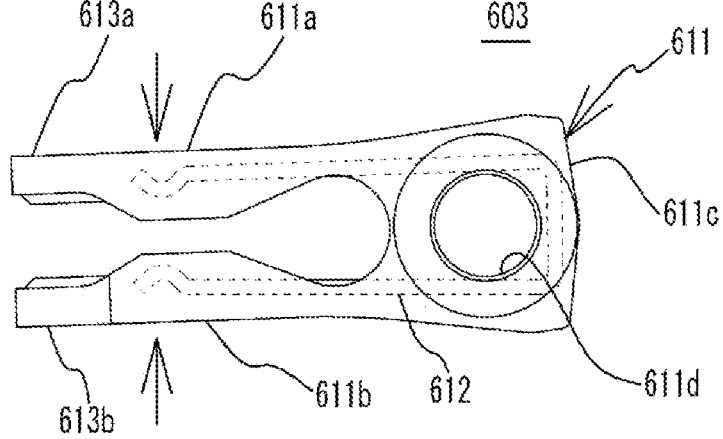
FIG. 8B is a side view of the rack.

As illustrated in FIG. 8B, the rack body 611 includes a first sidewall portion 611a, a second sidewall portion 611b opposed to the first sidewall portion 611a, and a connecting portion 611c connecting the first sidewall portion 611a and the second sidewall portion 611b. A through-hole 611d into which a first member 331a of the rack holding shaft 331 is inserted is formed in the connecting portion 611c.

The first sidewall portion 611a, the second sidewall portion 611b, and the connecting portion 611c are formed of one member. The rack body 611 is made of a flexible resin such as polyacetal.

The first sidewall portion 611a has two first contact portions 613a in contact with the lead screw 602, and the second sidewall portion 611b has one second contact portion 613b in contact with the lead screw 602. The first contact portions 613a and the second contact portion 613b are configured to sandwich the lead screw 602. Further, the first contact portions 613a and the second contact portion 613b are alternately arranged. Screw threads having a shape complementary to the screw threads of the lead screw 602 are formed on the inner surfaces of the first contact portions 613a and the second contact portion 613b.

The biasing member 612 is, for example, a leaf spring, one end of which is engaged with the first sidewall portion 611a and the other end of which is engaged with the second sidewall portion 611b, and biases the first sidewall portion 611a and the second sidewall portion 611b inward with substantially the same force as indicated by arrows in FIG. 8B. Accordingly, since the first contact portions 613a and the second contact portion 613b are biased to approach each other, the screw threads formed on the inner surfaces of the first contact portions 613a and the second contact portion 613b are in close contact with the screw threads formed on the lead screw 602. As a result, backlash between the lead screw 602 and the rack 603 is reduced. As long as the first sidewall portion 611a and the second sidewall portion 611b can be biased inward with substantially the same force, a biasing member such as a torsion coil spring may be used as the biasing member 612.

Next, the rack holding mechanism 33 will be described in detail.

As illustrated in FIG. 6A to FIG. 7A, the rack holding mechanism 33 includes a rack holding shaft 331, a shaft holding portion 332, and a compression spring 333.

As illustrated in FIG. 3, the shaft holding portion 332 protrudes from the outer periphery of the first lens holding frame F1 in a direction intersecting the optical axis OA direction, and passes through the hole 22 of the second fixed barrel 20.

As illustrated in FIG. 7A, the shaft holding portion 332 has a through-hole 332a through which the rack holding shaft 331 is inserted. The through-hole 332a is a stepped through-hole. The through-hole 332a is located further outward than the outer peripheral surface of the second fixed barrel 20.

Further, the shaft holding portion 332 is provided with a light shielding portion 334 that passes between the detection portions of a photointerrupter (not illustrated). Thus, the position of the first lens holding frame F1 can be detected. The light shielding portion 334 is disposed further outward than the second fixed barrel 20.

The rack holding shaft 331 has the first member 331a and a second member 331b. The first member 331a has a flange portion 331a1, is inserted into the through-hole 611d of the rack body 611, and has one end inserted into the through-hole 332a of the shaft holding portion 332, thereby holding the rack 603 between the flange portion 331a1 and the shaft holding portion 332. The second member 331b is inserted into the shaft holding portion 332 from the side opposite to the first member 331a and is coupled to the first member 331a. Since the through-hole 332a of the shaft holding portion 332 is positioned further outward than the outer peripheral surface of the second fixed barrel 20, the rack 603 held by the rack holding shaft 331 inserted into the through-hole 332a is disposed further outward than the second fixed barrel 20.

The first member 331a is biased in a direction indicated by an arrow A3 in FIG. 7A by the compression spring 333 disposed in the through-hole 332a of the shaft holding portion 332. Accordingly, the rack 603 is also biased in the direction indicated by the arrow A3 and is pressed against the shaft holding portion 332. Since the rack 603 is not completely fixed to the shaft holding portion 332, the rack 603 can swing (rotate) around the axis of the rack holding shaft 331. Therefore, as compared with a case in which the rack 603 is directly screwed to the shaft holding portion 332, it is possible to inhibit an unnecessary force from being applied to the first lens holding frame F1. Thus, the load applied to the stepping motor 601 can be reduced.

As illustrated in FIG. 8A, spherical protruding portions 332d are formed on a surface 332c of the shaft holding portion 332 that is in contact with the rack 603, and the protruding portions 332d are in contact with the rack 603. As illustrated in FIG. 7B and FIG. 7C, the through-hole 332a of the shaft holding portion 332 is formed such that the first member 331a and the second member 331b are movable in the radial direction of the first lens holding frame F1 indicated by arrows A5 and A7 but are not movable in the circumferential direction around the optical axis OA indicated by arrows A6 and A8. That is, the through-hole 332a is formed such that gaps are present between the side surface of the through-hole 332a and the first member 331a and between the side surface of the through-hole 332a and the second member 331b in the radial direction indicated by the arrows A5 and A7, but the side surface of the through-hole 332a is in contact with the first member 331a and the second member 331b (there is no gap between the through-hole 332a and the first member 331a and between the through-hole 332a and the second member 331b) in the circumferential direction indicated by the arrows A6 and A8. Accordingly, backlash in the circumferential direction is eliminated, and the followability of the rack 603 with respect to the lead screw 602 in the circumferential direction is improved.

The rack 603 is biased in the direction indicated by the arrow A3, and the side surface of the rack 603 is in contact with the spherical protrusion portions 332d. Further, the rack holding shaft 331 is held by the shaft holding portion 332 so as to be movable in the radial direction of the first lens holding frame F1 about the optical axis OA. This allows the rack 603 to swing as indicated by an arrow A4 in FIG. 7A. Further, as described above, the rack 603 is rotatable about the axis of the rack holding shaft 331. Although it is difficult to make the axial direction of the lead screw 602 completely parallel to the optical axis OA direction, according to the present embodiment, the above-described configuration allows the rack 603 to follow the lead screw 602, and the movement accuracy of the first lens holding frame F1 in the optical axis OA direction can be improved.

Since the rack holding mechanisms 33 and 43 have substantially the same configuration, detailed description of the rack holding mechanism 43 will be omitted. More specifically, as illustrated in FIG. 3, the rack holding mechanism 43 includes a shaft holding portion 432 similar to the shaft holding portion 332, a light shielding portion 434 similar to the light shielding portion 334, a through-hole 432a similar to the through-hole 332a, and the like.

As described above in detail, the lens barrel 100 in accordance with the present embodiment includes the first lens holding frame F1 that holds the first lens group L1 and has the first protruding portion 31, the stepping motor 601 that moves the first lens holding frame F1 in the optical axis OA direction, the second lens holding frame F2 that holds the second lens group L2 and has the second protruding portion 41, the stepping motor 701 that moves the second lens holding frame F2 in the optical axis OA direction, and the second fixed barrel 20 that has the straight groove 21 engaging with the first protruding portion 31 and the second protruding portion 41 and extending in the optical axis OA direction, and is disposed further outward than the first lens holding frame F1 and the second lens holding frame F2. Accordingly, it is possible to restrict the rotation of the first lens holding frame F1 and the second lens holding frame F2 around the optical axis OA and to linearly move the first lens holding frame F1 and the second lens holding frame F2 in the optical axis OA direction. In addition, since the first protruding portion 31 of the first lens holding frame F1 and the second protruding portion 41 of the second lens holding frame F2 share one straight groove 21, the second fixed barrel 20 can have a simple structure, and the first lens holding frame F1 and the second lens holding frame F2 can be moved in the optical axis direction with high accuracy.

In the present embodiment, the first protruding portion 31 and the second protruding portion 41 at least partially overlap each other in the circumferential direction about the optical axis OA. Thus, the first protruding portion 31 and the second protruding portion 41 can guide each other in the optical axis OA direction in the straight groove 21. Further, the length of the straight groove 21 in the optical axis OA direction can be shortened.

Further, in the present embodiment, in the circumferential direction around the optical axis OA, the first protruding portion 31 and the second protruding portion 41 are in contact with each other, and the second protruding portion 41 is in contact with one wall 21b of the straight groove 21. Further, the lens barrel 100 includes the block 50 movable relative to the first protruding portion 31 in the circumferential direction around the optical axis OA, and the compression springs 51 disposed between the first protruding portion 31 and the block 50. The block 50 is in contact with the other wall 21a of the straight groove 21. This configuration reduces backlash when the first lens holding frame F1 and the second lens holding frame F2 move independently. Further, it is possible to reduce backlash between the first lens holding frame F1 and the second lens holding frame F2.

In a guide bar type lens barrel in which a lens holding frame is linearly guided along a guide bar in the optical axis OA direction, the lens holding frame is often biased against the guide bar by a biasing member such as a spring so that backlash does not occur between the lens holding frame and the guide bar when a camera is inclined. In this case, since a sliding resistance between the lens holding frame and the guide bar increases and a force by the biasing member is applied to the lens holding frame, a relatively large torque is required for moving the lens holding frame, and it may be difficult to drive the lens holding frame with a small stepping motor. In contrast, in the lens barrel 100 in accordance with the present embodiment, since the first lens holding frame F1 and the second lens holding frame F2 are biased by the block 50 and the compression spring 51 in the directions in which the first lens holding frame F1 and the second lens holding frame F2 come into contact with the walls 21a and 21b, respectively, in each of the three straight grooves 21, an excessive force is not applied to the first lens holding frame F1 or the second lens holding frame F2. Therefore, it is possible to drive the first lens holding frame F1 and the second lens holding frame F2 even by using a small stepping motor having a relatively small torque. Therefore, it is possible to accurately move the first lens holding frame F1 and the second lens holding frame F2 in the optical axis OA direction.

Further, in the present embodiment, each of the first protruding portion 31, the second protruding portion 41, and the block 50 has a bearing. Therefore, it is possible to reduce sliding resistance when the first lens holding frame F1 and the second lens holding frame F2 move.

Further, in the present embodiment, the second fixed barrel 20 has a plurality of the straight grooves 21, and the stepping motor 601 and the stepping motor 701 are disposed between two straight grooves 21 disposed side by side in the circumferential direction about the optical axis OA among the plurality of the straight grooves 21. Therefore, the stepping motor 601 and the stepping motor 701 can be arranged in a well-balanced manner. Further, since the stepping motors 601 and 701 can be arranged in an empty space between the first fixed barrel 10 and the second fixed barrel 20, the lens barrel 100 can be miniaturized.

In the present embodiment, the lens barrel 100 includes the lead screw 602 rotated by the stepping motor 601 and the rack body 611 held by the first lens holding frame F1 and engaged with the lead screw 602, the rack body 611 includes the first sidewall portion 611a, the second sidewall portion 611b, and the connecting portion 611c connecting the first sidewall portion 611a and the second sidewall portion 611b, and the first sidewall portion 611a, the second sidewall portion 611b, and the connecting portion 611c are composed of one member. Since the number of components is reduced, it is possible to reduce failures compared to a case in which the rack body 611 is composed of a plurality of members.

Further, the first sidewall portion 611a has the first contact portion 613a that is in contact with the lead screw 602, the second sidewall portion 611b has the second contact portion 613b in contact with the lead screw 602, and the lens barrel 100 includes the biasing member 612 that biases the rack body 611 so that the first contact portion 613a and the second contact portion 613b approach each other. This configuration brings the screw threads formed on the inner surfaces of the first contact portion 613a and the second contact portion 613b into close contact with the screw threads formed on the lead screw 602, thereby reducing backlash.

In addition, for example, when one of the first sidewall portion 611a and the second sidewall portion 611b is biased using a torsion spring or the like to bring the screw threads formed on the inner surface of the first contact portion 613a or the second contact portion 613b into close contact with the screw threads formed on the lead screw 602, a reaction force of the force against the first sidewall portion 611a or the second sidewall portion 611b is applied to the first lens holding frame F1 through the rack body 611 and the rack holding shaft 331, and affects the first lens holding frame F1 supported in a well-balanced manner by the three straight grooves 21. In the present embodiment, since the first contact portion 613a and the second contact portion 613b are biased toward the lead screw 602 with substantially the same force, no reaction force is generated in the rack body 611. Therefore, it is possible to inhibit an unnecessary force from being applied to the first lens holding frame F1. Therefore, the first lens holding frame F1 can be held in the second fixed barrel 20 in a well-balanced manner. The same applies to the second lens holding frame F2.

As described in detail above, the lens barrel 100 in accordance with the present embodiment includes the stepping motor 601, the lead screw 602 rotated by the stepping motor 601, the rack 603 engaged with the lead screw 602, the first lens holding frame F1 holding the first lens group L1, and the second fixed barrel 20 disposed further outward than the first lens holding frame F1, and the peripheral wall of the second fixed barrel 20 exists between the lead screw 602 and the first lens holding frame F1. Since the peripheral wall of the second fixed barrel 20 is interposed between the first lens holding frame F1 and the lead screw 602, lubricant applied to the lead screw 602 and dust generated by sliding between the lead screw 602 and the rack 603 can be inhibited from adhering to the first lens group L1 and the second lens group L2 as compared with a case in which the lead screw 602 is disposed between the second fixed barrel 20 and the first lens holding frame F1 (a case in which the lead screw 602 is disposed further inward than the second fixed barrel 20).

Further, in the present embodiment, the lens barrel 100 includes the mounting member 604 that fixes the stepping motor 601 to the second fixed barrel 20, and the lead screw 602 is disposed further outward than the third portion 604c of the mounting member 604. In addition, in the present embodiment, the rack 603 is disposed further outward than the third portion 604c of the mounting member 604. Further, the rack 603 is disposed further outward than the second fixed barrel 20. As a result, the components of the first drive source unit 60 that drives the first lens holding frame F1 can be disposed further outward than the second fixed barrel 20, that is, the second fixed barrel 20 can be interposed between the first drive source unit 60 and the first lens holding frame F1, so that the second fixed barrel 20 can inhibit dust from adhering to the first lens group L1 and the second lens group L2. The same applies to the second drive source unit 70.

Further, in the present embodiment, the second fixed barrel 20 has the hole 22 for arranging the rack 603 further outward than the second fixed barrel 20. Since there is no need to form a hole other than the hole 22 in the wall surface of the portion of the second fixed barrel 20 that accommodates the first lens holding frame F1 and the second lens holding frame F2, it is possible to reduce light leakage.

Further, in the present embodiment, the first lens holding frame F1 has the light shielding portion 334 that is detected by the photointerrupter (not illustrated) that detects the position of the first lens holding frame F1, and the light shielding portion 334 is disposed further outward than the second fixed barrel 20. Thus, since the light from the light emitting part of the photointerrupter can be blocked by the second fixed barrel 20, the influence of the light of the photointerrupter on imaging can be reduced.

In the above embodiment, at least a part of the stepping motor 601 is only required to be disposed further outward than the second fixed barrel 20. That is, a part of the stepping motor 601 may be disposed further inward than the second fixed barrel 20.

In addition, in the above embodiment, the second fixed barrel 20 that houses the first lens holding frame F1 and the second lens holding frame F2 may be a movable barrel that can linearly move in the optical axis OA direction. In the above embodiment, the lens barrel 100 may be a single focus lens or a zoom lens.

Further, the first drive source unit 60 and the second drive source unit 70 in accordance with the above embodiment may be applied to a guide bar type lens barrel in which the first lens holding frame F1 and the second lens holding frame F2 are linearly moved in the optical axis OA direction along a guide bar.

Further, the lens barrel 100 may include only one of the first lens holding frame F1 and the second lens holding frame F2. That is, to inhibit the intrusion of dust or the like, the configuration in which the peripheral wall of the second fixed barrel 20 is present between the lens holding frame and the lead screw can be applied to both a case in which there are a plurality of lens groups and a case in which there is only one lens group.

In the above embodiment, at least one of the bearings 311 included in the first protruding portion 31 and the bearings 411 included in the second protruding portion 41 may have a diameter different from those of the other bearings 311 and 411. For example, one of the two bearings 311 may have a different diameter than the other bearing 311. Also, one of the two bearings 411 may have a different diameter than the other bearing 411. Also, one of the two bearings 311 may have a different diameter than one or both of the two bearings 411. In addition, all of the two bearings 311 and the two bearings 411 may have different diameters. As described above, by changing the diameters of the bearings 311 and 411, it is possible to perform tilt adjustment and alignment of the first lens holding frame F1 and the second lens holding frame F2.

In the above embodiment, the compression springs 51 are provided between the first protruding portion 31 and the block 50, but this does not intend to suggest any limitation. Here, an arrangement example of the first protruding portion 31 and the second protruding portion 41 in accordance with variations will be described with reference to FIG. 9A to FIG. 11B.

(First Variation)

Figure 9A:
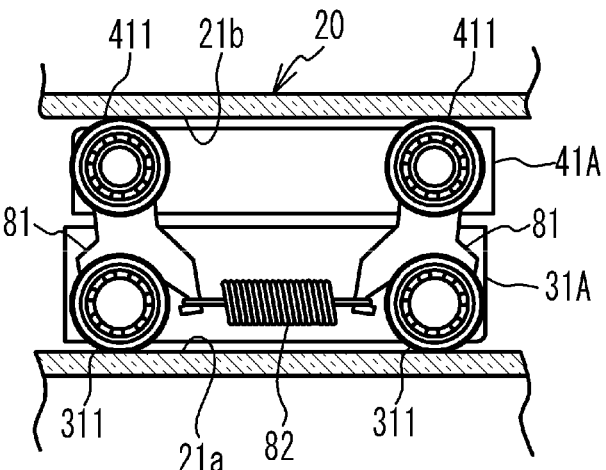
FIG. 9A and FIG. 9B illustrate an arrangement example of a first protruding portion and a second protruding portion in a straight groove in accordance with a first variation.
Figure 9B:
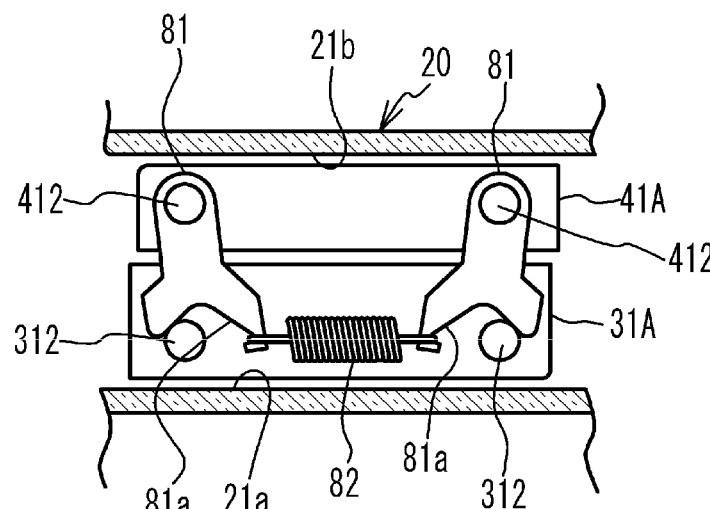

FIG. 9A is a diagram illustrating an arrangement example of a first protruding portion 31A and a second protruding portion 41A in accordance with a first variation. FIG. 9B illustrates a state in which the bearings 311 and 411 are removed in FIG. 9A.

As illustrated in FIG. 9A, in the first variation, the first protruding portion 31A has the bearings 311, and the bearings 311 are in contact with one wall 21a of the straight groove 21. The second protruding portion 41A has the bearings 411, and the bearings 411 are in contact with the other wall 21b of the straight groove 21.

Two pressing members 81 are provided between the first protruding portion 31A and the second protruding portion 41A. As illustrated in FIG. 9B, one end of the pressing member 81 is engaged with a protrusion 412 of the second protruding portion 41A, and the other end of the pressing member 81 is partially in contact with a protrusion 312 of the first protruding portion 31A. The two pressing members 81 are connected by a tension spring 82. When the pressing members 81 are pulled by the tension spring 82, the protrusion 312 and the protrusion 412 are pushed along an inclined surface 81a formed at the other end of the pressing member 81 in a direction in which the first protruding portion 31A and the second protruding portion 41A move away from each other. Accordingly, since the first protruding portion 31A and the second protruding portion 41A are respectively pressed against the wall 21b and the wall 21a, backlash when the first lens holding frame F1 and the second lens holding frame F2 linearly move in the optical axis OA direction along the straight groove 21 is reduced.

(Second Variation)

Figure 10:
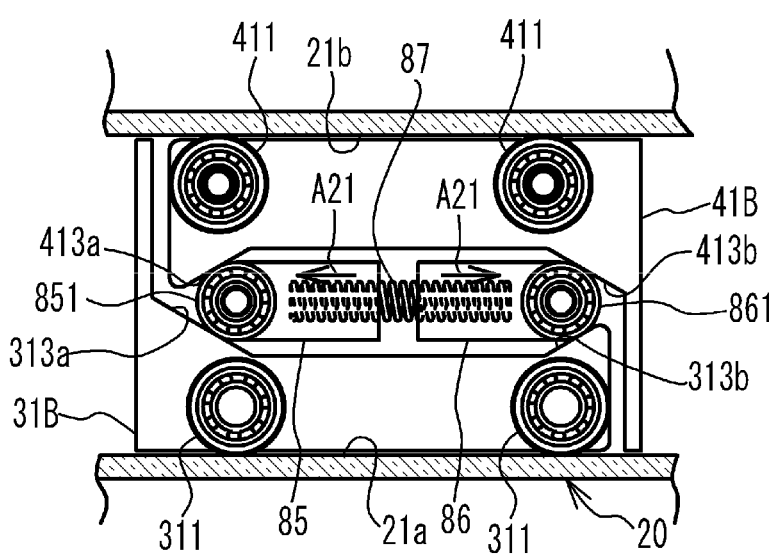
FIG. 10 illustrates an arrangement example of the first protruding portion and the second protruding portion in the straight groove in accordance with a second variation.

FIG. 10 is a diagram illustrating an arrangement example of a first protruding portion 31B and a second protruding portion 41B in accordance with a second variation. In the second variation, a first block 85 having a bearing 851 and a second block 86 having a bearing 861 are provided between the first protruding portion 31B and the second protruding portion 41B. A compression spring 87 is provided between the first block 85 and the second block 86. The compression spring 87 biases the first block 85 and the second block 86 in a direction in which the first block 85 and the second block 86 move away from each other, as indicated by arrows A21. As a result, the first block 85 and the second block 86 push up inclined faces 313a and 313b formed on the first protruding portion 31B, respectively, and push up inclined faces 413a and 413b formed on the second protruding portion 41B, respectively. As a result, the first protruding portion 31B and the second protruding portion 41B are biased in a direction in which the first protruding portion 31B and the second protruding portion 41B move away from each other and are pressed against the wall 21a and the wall 21b, respectively. Therefore, backlash when the first lens holding frame F1 and the second lens holding frame F2 linearly move in the optical axis OA direction along the straight groove 21 is reduced.

(Third Variation)

Figure 11A:
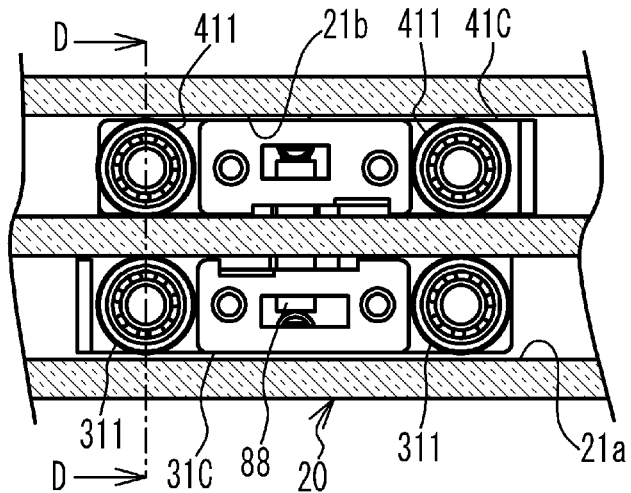
FIG. 11A and FIG. 11B illustrate an arrangement example of the first protruding portion and the second protruding portion in the straight groove in accordance with a third variation.
Figure 11B:
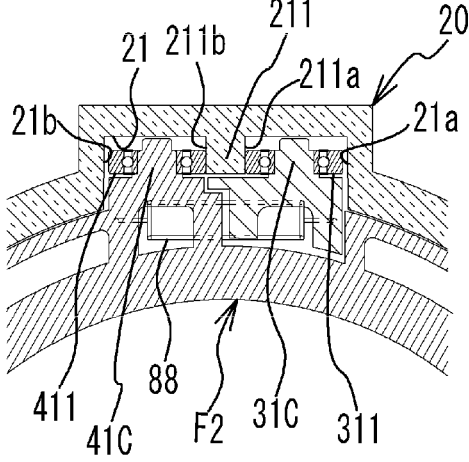

FIG. 11A is a diagram illustrating an arrangement example of a first protruding portion 31C and a second protruding portion 41C in accordance with a third variation, and FIG. 11B is a cross-sectional view taken along line D-D of FIG. 11A. As illustrated in FIG. 11A, in the third variation, the straight groove 21 included in the second fixed barrel 20 includes a protruding portion 211, and the first protruding portion 31C and the second protruding portion 41C are connected by a tension spring 88. The first protruding portion 31C has the bearings 311 and is in contact with one sidewall portion 211a of the protruding portion 211. The second protruding portion 41C has the bearings 411, and is in contact with another sidewall portion 211b of the protruding portion 211. The tension spring 88 biases the first protruding portion 31C and the second protruding portion 41C in a direction in which the first protruding portion 31 and the second protruding portion 41 approach each other. As a result, the first protruding portion 31C is pressed against the sidewall portion 211a, and the second protruding portion 41C is pressed against the sidewall portion 211b. Therefore, backlash when the first lens holding frame F1 and the second lens holding frame F2 linearly move in the optical axis OA direction along the straight groove 21 is reduced.

Figure 12A:
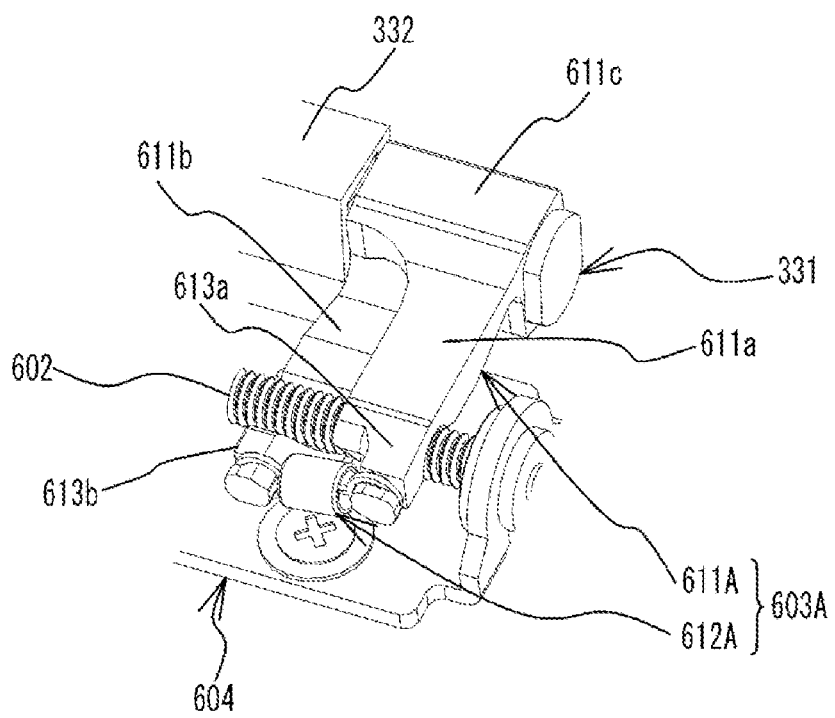
FIG. 12A and FIG. 12B are views for describing a rack in accordance with a variation.
Figure 12B:
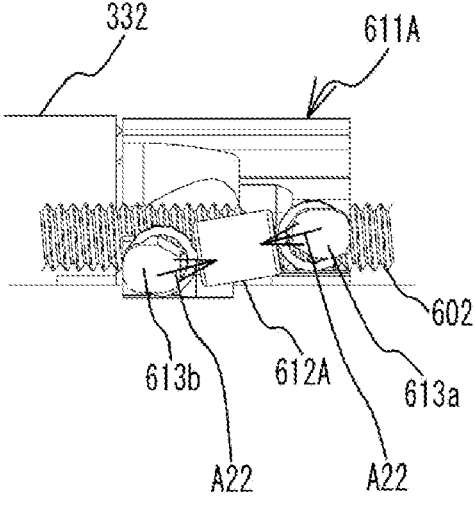

Further, the configuration of the rack 603 is not limited to the above embodiment. FIG. 12A and FIG. 12B illustrate a rack 603A in accordance with a variation. As illustrated in FIG. 12A, a rack body 611A of the rack 603A includes the first sidewall portion 611a, the second sidewall portion 611b, and the connecting portion 611c connecting the first sidewall portion 611a and the second sidewall portion 611b, and the first sidewall portion 611a, the second sidewall portion 611b, and the connecting portion 611c are formed of one member.

In the variation, the end of the first contact portion 613a of the first sidewall portion 611a and the end of the second contact portion 613b of the second sidewall portion 611b are connected by a tension spring 612A. As a result, the first contact portion 613a and the second contact portion 613b are biased obliquely toward each other as indicated by arrows A22 in FIG. 12B. Thus, since the screw threads formed on the inner side of the first contact portion 613a and the screw threads formed on the inner side of the second contact portion 613b are in close contact with the screw threads of the lead screw 602, it is possible to reduce backlash. In addition, since the first contact portion 613a and the second contact portion 613b are biased toward the lead screw 602 with substantially the same force, no reaction force is generated in the rack body 611A. Therefore, it is possible to inhibit an unnecessary force from being applied to the first lens holding frame F1. Thus, the first lens holding frame F1 can be held in the second fixed barrel 20 in a well-balanced manner.

The above-described embodiments are examples of preferred implementations. However, the present invention is not limited to this, and various modifications can be made without departing from the scope of the invention, and arbitrary constituent elements may be combined. The disclosures of the publications cited in the above description are incorporated herein by reference.

DESCRIPTION OF REFERENCE NUMERALS 1 camera
10 first fixed barrel
20 second fixing barrel
21 straight groove
21a, 21b wall
22 hole
31 first protruding portion
41 second protruding portion
50 block
51 compression spring
60 first drive source unit
70 second drive source unit
100 lens barrel
311, 411, 501 bearing
601, 701 stepping motor
602, 702 lead screw
603, 703 rack
611 rack body
611a first sidewall portion
611b second sidewall portion
611c connecting portion
612 biasing member
612A tension spring
613a first contact portion
613b second contact portion
F1 first lens holding frame F2 second lens holding frame
L1 first lens group
L2 second lens group

The invention claimed is:

1. A lens barrel comprising:
a first lens holding frame that holds a first lens;
a first protruding portion protruding from the first lens holding frame;
a first motor configured to move the first lens holding frame in an optical axis direction;
a second lens holding frame that holds a second lens;
a second protruding portion protruding from the second lens holding frame;
a second motor configured to move the second lens holding frame in the optical axis direction; and
an outer barrel that (i) has a straight groove, which engages with the first protruding portion and the second protruding portion and extends in the optical axis direction, and (ii) is disposed further outward than the first lens holding frame and the second lens holding frame, wherein:
the straight groove extends continuously between first and second ends in the optical axis direction;
the first and second protruding portions are located within the straight groove between the first and second ends; and
the first protruding portion and the second protruding portion (i) at least partially overlap each other in a circumferential direction about an optical axis and (ii) are in contact with each other in the circumferential direction.

2. The lens barrel according to claim 1, wherein the second protruding portion is in contact with one wall of the straight groove.

3. The lens barrel according to claim 2, further comprising:
a moving portion that is movable relative to the first protruding portion in the circumferential direction about the optical axis; and
a biasing portion disposed between the first protruding portion and the moving portion.

4. The lens barrel according to claim 3, wherein the moving portion is in contact with another wall of the straight groove.

5. The lens barrel according to claim 3, wherein at least one of the first protrusion, the second protrusion, and the moving portion has a bearing.

6. The lens barrel according to claim 5,
wherein the first protruding portion and the second protruding portion each have a bearing, and
wherein at least one of the bearings has a different diameter than the other bearing.

7. The lens barrel according to claim 1,
wherein the outer barrel has a plurality of the straight grooves, and
wherein the first motor and the second motor are disposed between a first straight groove and a second straight groove that are disposed side by side in the circumferential direction around an optical axis among the plurality of straight grooves.

8. The lens barrel according to claim 1, wherein the first lens and the second lens are focus lenses.

9. The lens barrel according to claim 1, further comprising:
a rotating shaft rotated by the first motor; and
an engagement portion held by the first lens holding frame and engaged with the rotating shaft, wherein the engagement portion includes a first sidewall portion, a second sidewall portion, and a connecting portion that connects the first sidewall portion and the second sidewall portion, and wherein the first sidewall portion, the second sidewall portion, and the connecting portion are formed of one member.

10. The lens barrel according to claim 9, wherein the first sidewall portion includes a first contact portion that is in contact with the rotating shaft, wherein the second sidewall portion includes a second contact portion that is in contact with the rotating shaft, and wherein a biasing portion that biases the engaging portion so that the first contact portion and the second contact portion approach each other is provided.

11. An imaging apparatus comprising the lens barrel according to claim 1.

\* \* \* \* \*